(12) United States Patent
Velikov et al.

(10) Patent No.: US 11,658,868 B2
(45) Date of Patent: *May 23, 2023

(54) MIXED MODE MANAGEMENT

(71) Applicant: VMware, Inc., Palo Alto, CA (US)

(72) Inventors: Vladimir Velikov, Sofia (BG); Petar Nikalaev Ivanov, Sofia (BG); Bisser Peshev, Sofia (BG); Vasil Manolov, Sofia (BG)

(73) Assignee: VMware, Inc., Palo Alto, CA (US)

( * ) Notice: Subject to any disclaimer, the term of this patent is extended or adjusted under 35 U.S.C. 154(b) by 191 days.

This patent is subject to a terminal disclaimer.

(21) Appl. No.: 17/319,887

(22) Filed: May 13, 2021

(65) Prior Publication Data

US 2021/0266222 A1 Aug. 26, 2021

Related U.S. Application Data

(63) Continuation of application No. 16/851,427, filed on Apr. 17, 2020, now Pat. No. 11,018,932, which is a continuation of application No. 15/655,450, filed on Jul. 20, 2017, now Pat. No. 10,630,544.

(51) Int. Cl.
*H04L 41/0813* (2022.01)
*H04L 41/084* (2022.01)

(52) U.S. Cl.
CPC ........ *H04L 41/0813* (2013.01); *H04L 41/084* (2013.01)

(58) Field of Classification Search
None
See application file for complete search history.

(56) References Cited

U.S. PATENT DOCUMENTS

| | | | |
|---|---|---|---|
| 6,202,208 B1 | 3/2001 | Holiday | |
| 7,484,208 B1 | 1/2009 | Nelson | |
| 8,601,471 B2 | 12/2013 | Beaty | |
| 9,596,297 B2 | 3/2017 | Sramka | |
| 2004/0073782 A1 | 4/2004 | Price | |
| 2006/0080425 A1 | 4/2006 | Wood | |
| 2008/0222617 A1 | 9/2008 | Fernando | |
| 2009/0150526 A1* | 6/2009 | Wu | H04L 41/0803 709/223 |
| 2010/0223367 A1 | 9/2010 | Dehaan | |
| 2013/0124702 A1 | 5/2013 | Shah | |
| 2014/0089473 A1 | 3/2014 | Nakano | |
| 2014/0123122 A1 | 5/2014 | Dhanyamraju | |
| 2014/0282471 A1 | 9/2014 | Chaney | |

(Continued)

OTHER PUBLICATIONS

"Web Search History from U.S. Appl. No. 16/851,427".

*Primary Examiner* — Mohamed Ibrahim
(74) *Attorney, Agent, or Firm* — Clayton, McKay & Bailey, PC

(57) ABSTRACT

The present disclosure is related to mixed mode management. A machine-readable medium may store instructions executable by a processing resource to determine that a first management node is operating according to a different configuration profile than a second management node and, responsive to the determination, transfer a mixed mode management plug-in from the first management node. The machine-readable medium may further store instructions executable by the processing resource to execute the mixed mode management plug-in on the second management node.

20 Claims, 4 Drawing Sheets

(56) References Cited

U.S. PATENT DOCUMENTS

| | | | |
|---|---|---|---|
| 2014/0317682 A1 | 10/2014 | Erickson | |
| 2015/0067167 A1* | 3/2015 | Kuppala | ................ H04L 67/51 |
| | | | 709/225 |
| 2015/0199447 A1 | 7/2015 | Zhou | |
| 2016/0154661 A1 | 6/2016 | Paul | |
| 2016/0266892 A1 | 9/2016 | Sn | |
| 2017/0034023 A1 | 2/2017 | Nickolov | |
| 2018/0309623 A1* | 10/2018 | Szobi | ................ H04L 41/0869 |
| 2018/0309788 A1* | 10/2018 | Johnson | ................ H04L 63/10 |
| 2019/0372844 A1* | 12/2019 | Moats | ................ H04L 41/0806 |

* cited by examiner

MIXED MODE MANAGEMENT

This application claims priority as a continuation of application Ser. No. 16/851,427, entitled "MIXED MODE MANAGEMENT" and filed Apr. 17, 2020, which is a continuation of application Ser. No. 15/655,450, entitled "MIXED MODE MANAGEMENT" and filed Jul. 20, 2017, both of which are expressly incorporated by reference herein for all purposes.

BACKGROUND

Virtual computing instances (VCIs), such as virtual machines, virtual workloads, data compute nodes, clusters, and containers, among others, have been introduced to lower data center capital investment in facilities and operational expenses and reduce energy consumption. A VCI is a software implementation of a computer that executes application software analogously to a physical computer. VCIs have the advantage of not being bound to physical resources, which allows VCIs to be moved around and scaled to meet changing demands of an enterprise without affecting the use of the enterprise's applications. VCIs can be deployed on a hypervisor provisioned with a pool of computing resources (e.g., processing resources, memory resources, etc.).

DETAILED DESCRIPTION

Figure 1:
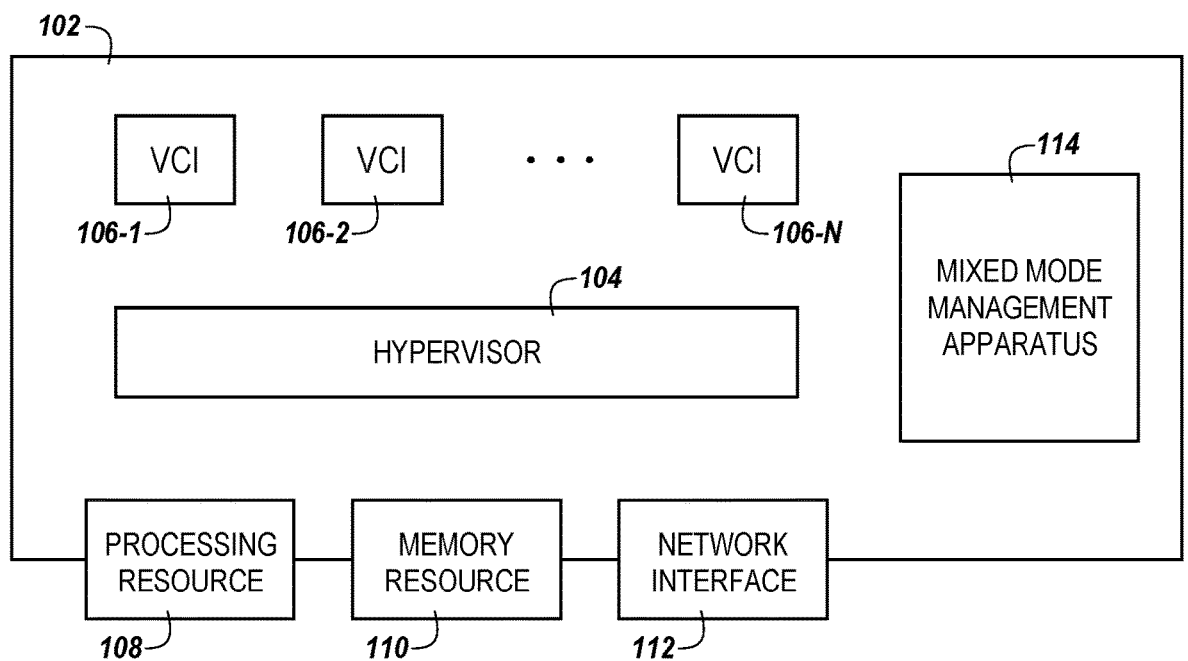
FIG. 1 is a diagram of a host for mixed mode management according to the present disclosure.

The term "virtual computing instance" (VCI) covers a range of computing functionality. VCIs may include non-virtualized physical hosts, virtual machines (VMs), and/or containers. Containers can run on a host operating system without a hypervisor or separate operating system, such as a container that runs within Linux. A container can be provided by a virtual machine that includes a container virtualization layer (e.g., Docker). A VM refers generally to an isolated end user space instance, which can be executed within a virtualized environment. Other technologies aside from hardware virtualization can provide isolated end user space instances may also be referred to as VCIs. The term "VCI" covers these examples and combinations of different types of VCIs, among others.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. The host operating system can use name spaces to isolate the containers from each other and therefore can provide operating-system level segregation of the different groups of applications that operate within different containers. This segregation is akin to the VM segregation that may be offered in hypervisor-virtualized environments that virtualize system hardware, and thus can be viewed as a form of virtualization that isolates different groups of applications that operate in different containers. Such containers may be more lightweight than VMs.

Multiple VCIs can be configured to be in communication with each other in a software defined data center. In such a system, information can be propagated from an end user to at least one of the VCIs in the system, between VCIs in the system, and/or between at least one of the VCIs in the system and a non-virtualized physical host.

Software defined data centers are dynamic in nature. For example, VCIs and/or various application services, may be created, used, moved, or destroyed within the software defined data center. When VCIs are created (e.g., when a container is initialized), various processes and/or services start running and consuming resources. As used herein, "resources" are physical or virtual components that have a finite availability within a computer or software defined data center. For example, resources include processing resources, memory resources, electrical power, and/or input/output resources, etc.

In some embodiments, a software defined data center may include a group of server instances (e.g., nodes) linked in a group. Such a group may include an infrastructure node, which may provide common services for a plurality of management nodes. When the infrastructure node and/or the management nodes are upgraded, they may be upgraded one-by-one (e.g., a rolling upgrade may be performed). For example, the infrastructure node and/or management nodes may have their configuration profile upgraded from a previous version of the configuration profile to a new version of the configuration profile. As used herein, a "configuration profile" is a set of instructions that manage computer hardware and/or software in a software defined data center. Non-exhaustive examples of configuration profiles include operating systems, web applications, and other instructions that manage computer hardware and/or software in a software defined data center.

In some embodiments, although some of the nodes have been upgraded to the new configuration profile, some of the nodes may not have been upgraded to the new configuration profile. For example, one or more of the management nodes may be upgraded to the new configuration profile while one or more of the management nodes have not been upgraded to the new configuration profile. This scenario may result in a valid operational state of the environment, which may be referred to as a "mixed mode environment." The mixed mode environment may arise as a result of some of the nodes operating using one version of the configuration profile while other nodes are operating using a different (e.g., a second) version of the configuration profile. In some embodiments, a version of the configuration profile used by some of the nodes may be a newer version of the configuration profile used by some of the other nodes.

Various issues may arise as a result of nodes operating in a mixed mode environment. For example, nodes running older versions of the configuration profile may not be compatible with management nodes that have been upgraded to a newer version of the configuration profile and may fail to connect and/or work with them when operated in a mixed mode environment. In addition, bugs or problems with the older version of the configuration profile (which may have been fixed in a newer version of the configuration profile) may persist on nodes that still have the older version of the configuration profile running on them. This may also lead to failure of the nodes running the older configuration profile.

In some approaches, in order to address such issues, a user may have to manually patch or upgrade the nodes that are experiencing problems (e.g., the nodes that are running the older version of the configuration profile). For example, if there is a flaw with the way particular instructions (e.g., a server filtering algorithm or other algorithm required for operation of the node) are being executed in the older version of the configuration profile, a user may have to manually patch and/or upgrade the older configuration profile to make the node or a web application associated with the node usable. As another example, there could be bugs in the older version of the configuration profile regarding how a web application handles the node that may have been fixed in the newer version of the configuration profile, but not in the older version of the configuration profile. This may lead to instability in the node running the older version of the configuration profile. Depending on the environment, these issues may be expensive or even impossible to correct without upgrading every node to the new version of the configuration profile under some approaches.

In contrast, embodiments herein allow for a mixed mode management plug-in to be automatically requested by nodes running the older version of the configuration profile in response to a determination that another node is running a newer version of the configuration profile. The mixed mode management plug-in may be automatically acquired by the node running the older version of the configuration profile and may be automatically executed by the node running the older version of the configuration profile to patch the older version of the configuration profile. In some embodiments, the older version of the configuration profile may be patched by executing the mixed mode management plug-in such that issues arising as a result of the different configuration profiles operating on different nodes in the mixed mode environment may be resolved.

The terminology used herein is for the purpose of describing particular embodiments, and is not intended to be limiting. As used herein, the singular forms "a", "an", and "the" include singular and plural referents unless the content clearly dictates otherwise. Furthermore, the words "can" and "may" are used throughout this application in a permissive sense (i.e., having the potential to, being able to), not in a mandatory sense (i.e., must). The term "include," and derivations thereof, mean "including, but not limited to."

The figures herein follow a numbering convention in which the first digit or digits correspond to the drawing figure number and the remaining digits identify an element or component in the drawing. Similar elements or components between different figures may be identified by the use of similar digits. For example, 114 may reference element "14" in FIG. 1, and a similar element may be referenced as 214 in FIG. 2. A group or plurality of similar elements or components may generally be referred to herein with a single element number. For example a plurality of reference elements 106-1, 106-2, . . . , 106-N may be referred to generally as 106. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention, and should not be taken in a limiting sense.

Embodiments of the present disclosure are directed to mixed mode management, for example, in the context of a software defined data center (e.g., a distributed computing environment) including one or more VCIs and/or hosts. In some embodiments, a machine-readable medium may store instructions executable by a processing resource to determine that a first management node is operating according to a different configuration profile than a second management node. The instructions may be further executable by the processing resource to, responsive to the determination, transfer a mixed mode management plug-in from the first management node. The example machine-readable medium may further store instructions executable by the processing resource to execute the mixed mode management plug-in on the second management node. In some embodiments, the mixed mode management plug-in may be executed on the second management node to correct problems that may exist in the operation of the second management node with other nodes in the software defined data center.

FIG. 1 is a diagram of a host 102 for mixed node management according to the present disclosure. The system can include a host 102 with processing resources 108 (e.g., a number of processors), memory resources 110 (e.g., main memory devices and/or storage memory devices), and/or a network interface 112. The host 102 can be included in a software defined data center. A software defined data center can extend virtualization concepts such as abstraction, pooling, and automation to data center resources and services to provide information technology as a service (ITaaS). In a software defined data center, infrastructure, such as networking, processing, and security, can be virtualized and delivered as a service. A software defined data center can include software defined networking and/or software defined storage. In some embodiments, components of a software defined data center can be provisioned, operated, and/or managed through an application programming interface (API).

The host 102 can incorporate a hypervisor 104 that can execute a number of VCIs 106-1, 106-2, . . . , 106-N (referred to generally herein as "VCIs 106"). The VCIs can be provisioned with processing resources 108 and/or memory resources 110 and can communicate via the network interface 112. The processing resources 108 and the memory resources 110 provisioned to the VCIs can be local and/or remote to the host 102. For example, in a software defined data center, the VCIs 106 can be provisioned with resources that are generally available to the software defined data center and are not tied to any particular hardware device. By way of example, the memory resources 110 can include volatile and/or non-volatile memory available to the VCIs 106. The VCIs 106 can be moved to different hosts (not specifically illustrated), such that a different hypervisor manages the VCIs 106. In some embodiments, a VCI among the number of VCIs can include an infrastructure node. For example, VCI 106-1 can include an infrastructure node, and VCIs 106-2, . . . , 106-N can include one or more management nodes. The host 102 can be connected to (e.g., in communication with) a mixed mode management apparatus 114. As used herein, "nodes" may be physical machines or may be VCIs provisioned with a pool of physical processing resources. Multiple VCIs may be deployed on a particular node. An "infrastructure node" is a node that provides common services for the management nodes, and the "management nodes" are nodes that can control VCIs deployed thereon.

In some embodiments, the mixed mode management apparatus 114 can be configured to determine that one or more of the VCIs 106 are operating according to a configuration profile that is different than a configuration profile that one or more other VCIs 106 are operating according to. In some embodiments, one of the configuration profiles may be an older version of a different configuration profile. The mixed mode management apparatus 114 can be further configured to cause a mixed mode management plug-in to be transferred to, and executed by, the VCIs 106 that are operating according to the older version of the configuration profile. In some embodiments, the mixed mode management apparatus 114 can be deployed on (e.g., may be running on) the host 102, and/or one or more of the VCIs 106. In some embodiments, the mixed mode management apparatus 114 can be deployed on the host 102 or a VCI (e.g., VCI 106-1), which may be the only host 102 or VCI (e.g., VCI 106-1) that is running or is provisioned with a pool of computing resources. However, in some embodiments, the mixed mode management apparatus 114 may be deployed across multiple hosts and/or VCIs, for example hosts and/or VCIs not specifically illustrated in FIG. 1.

In some embodiments, the mixed mode management apparatus 114 can include a combination of software and hardware, or the mixed mode management apparatus 114 can include software and can be provisioned by processing resource 108. An example of a mixed mode management apparatus 114 is illustrated and described in more detail with respect to FIG. 2.

Figure 2:
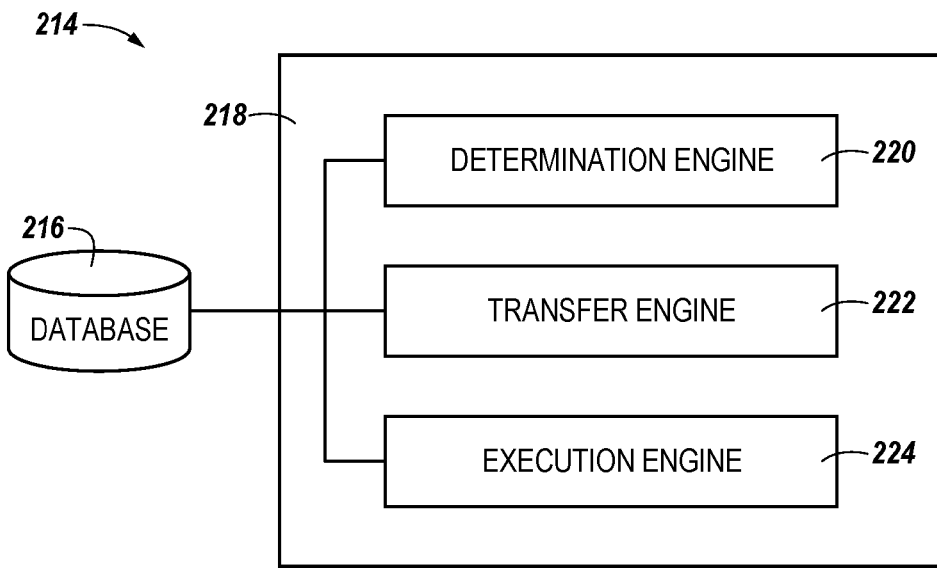
FIG. 2 is a diagram of a system for mixed mode management according to the present disclosure.

FIG. 2 is a diagram of an apparatus for mixed mode management according to the present disclosure. The apparatus 214 can include a database 216, a subsystem 218, and/or a number of engines, for example determination engine 220, transfer engine 222, and/or execution engine 224. The engines 220, 222, 224 can be in communication with the database 216 via a communication link. The apparatus 214 can include additional or fewer engines than illustrated to perform the various functions described herein. The apparatus 214 can represent program instructions and/or hardware of a machine (e.g., machine 326 as referenced in FIG. 3, etc.). As used herein, an "engine" can include program instructions and/or hardware, but at least includes hardware. Hardware is a physical component of a machine that enables it to perform a function. Examples of hardware can include a processing resource, a memory resource, a logic gate, etc.

The number of engines (e.g., 220, 222, 224) can include a combination of hardware and program instructions that are configured to perform a number of functions described herein. The program instructions (e.g., software, firmware, etc.) can be stored in a memory resource (e.g., machine-readable medium) as well as hard-wired program (e.g., logic). Hard-wired program instructions (e.g., logic) can be considered as both program instructions and hardware.

In some embodiments, the determination engine 220 can include a combination of hardware and program instructions that can be configured to determine that at least one management node is operating according to a different configuration profile than at least one different management node. One of the configuration profiles is a newer configuration profile than the other configuration profile. For example, a first management node may be operating according to a configuration profile that is newer than a configuration profile that a second management node is operating according to.

The transfer engine 222 can be configured to transfer (e.g., download) a mixed mode management plug-in from the management node that is operating according to the newer configuration profile. For example, the transfer engine 222 can, responsive to the determination that at least one management node is operating according to a different configuration profile than at least one different management node, cause the mixed mode management plug-in to be transferred from the management node that is running the newer configuration profile to the management node that is running an older configuration profile.

The execution engine 224 can be configured to execute the mixed mode management plug-in on the management node to which the mixed mode plug-in was transferred. For example, the execution engine 224 can be configured to cause the mixed mode management plug-in to be executed by the management node that is running the older version of the configuration profile.

Figure 3:
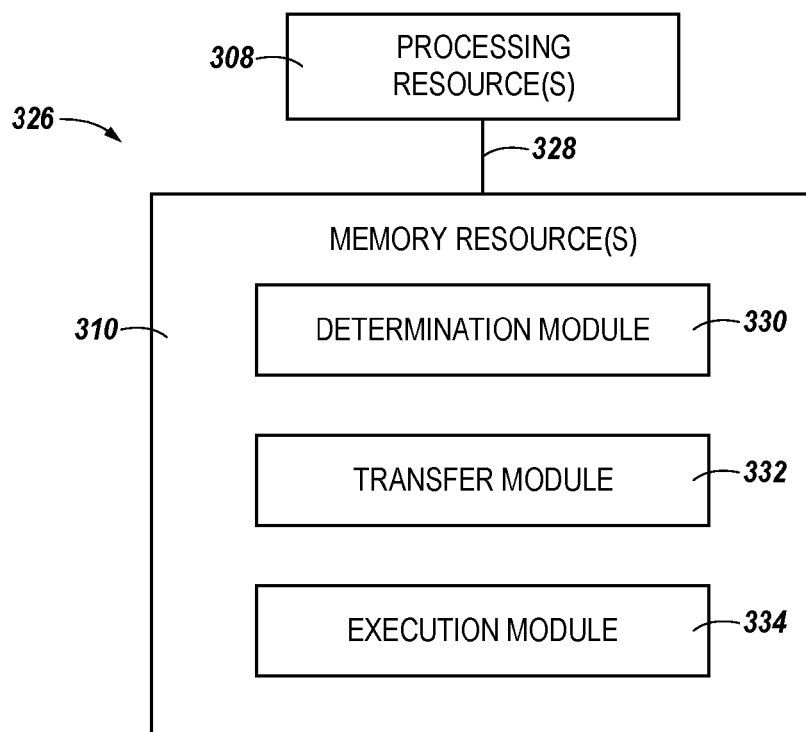
FIG. 3 is a diagram of a machine for mixed mode management according to the present disclosure.

FIG. 3 is a diagram of a machine for mixed mode management according to the present disclosure. The machine 326 can utilize software, hardware, firmware, and/or logic to perform a number of functions. The machine 326 can be a combination of hardware and program instructions configured to perform a number of functions (e.g., actions). The hardware, for example, can include a number of processing resource(s) 308 and a number of memory resource(s) 310, such as a machine-readable medium (MRM) or other memory resource(s) 310. The memory resource(s) 310 can be internal and/or external to the machine 326 (e.g., the machine 326 can include internal memory resources and have access to external memory resources). In some embodiments, the machine 326 can be a VCI, for example, the machine 326 can be a server. The program instructions (e.g., machine-readable instructions (MRI)) can include instructions stored on the MRM to implement a particular function (e.g., an action such as predicting application response time based on metrics). The set of MRI can be executable by one or more of the processing resource(s) 308. The memory resource(s) 310 can be coupled to the machine 326 in a wired and/or wireless manner. For example, the memory resource(s) 310 can be an internal memory, a portable memory, a portable disk, and/or a memory associated with another resource, e.g., enabling MRI to be transferred and/or executed across a network such as the Internet. As used herein, a "module" can include program instructions and/or hardware, but at least includes program instructions.

Memory resource(s) 310 can be non-transitory and can include volatile and/or non-volatile memory. Volatile memory can include memory that depends upon power to store information, such as various types of dynamic random access memory (DRAM) among others. Non-volatile memory can include memory that does not depend upon power to store information. Examples of non-volatile memory can include solid state media such as flash memory, electrically erasable programmable read-only memory (EEPROM), phase change random access memory (PCRAM), magnetic memory, optical memory, and/or a solid state drive (SSD), etc., as well as other types of machine-readable media.

The processing resource(s) 308 can be coupled to the memory resource(s) 310 via a communication path 328. The communication path 328 can be local or remote to the machine 326. Examples of a local communication path 328 can include an electronic bus internal to a machine, where the memory resource(s) 310 are in communication with the processing resource(s) 308 via the electronic bus. Examples of such electronic buses can include Industry Standard Architecture (ISA), Peripheral Component Interconnect (PCI), Advanced Technology Attachment (ATA), Small Computer System Interface (SCSI), Universal Serial Bus (USB), among other types of electronic buses and variants thereof. The communication path 328 can be such that the memory resource(s) 310 are remote from the processing resource(s) 308, such as in a network connection between the memory resources 310 and the processing resources 308. That is, in some embodiments, the communication path 328 can be a network connection. Examples of such a network connection can include a local area network (LAN), wide area network (WAN), personal area network (PAN), and the Internet, among others.

As shown in FIG. 3, the MRI stored in the memory resource(s) 310 can be segmented into a number of modules 330, 332, and 334 that when executed by the processing resource(s) 308, can perform a number of functions. As used herein a module includes a set of instructions included to perform a particular task or action. The number of modules 330, 332, 334 can be sub-modules of other modules. For example, the transfer module 332 can be a sub-module of the determination module 330 and/or can be contained within a single module. Furthermore, the number of modules 330, 332, 334 can comprise individual modules separate and distinct from one another. Examples are not limited to the specific modules 330, 332, 334 illustrated in FIG. 3.

Each of the number of modules 330, 332, 334 can include program instructions and/or a combination of hardware and program instructions that, when executed by processing resource(s) 308, can function as a corresponding engine as described with respect to FIG. 2. For example, the determination module 330 can include program instructions and/or a combination of hardware and program instructions that, when executed by processing resource(s) 308, can function as the determination engine 220, the transfer module 332 can include program instructions and/or a combination of hardware and program instructions that, when executed by processing resource(s) 308, can function as the transfer engine 222, and/or the execution module 334 can include program instructions and/or a combination of hardware and program instructions that, when executed by processing resource(s) 308, can function as the execution engine 224.

Figure 4A:
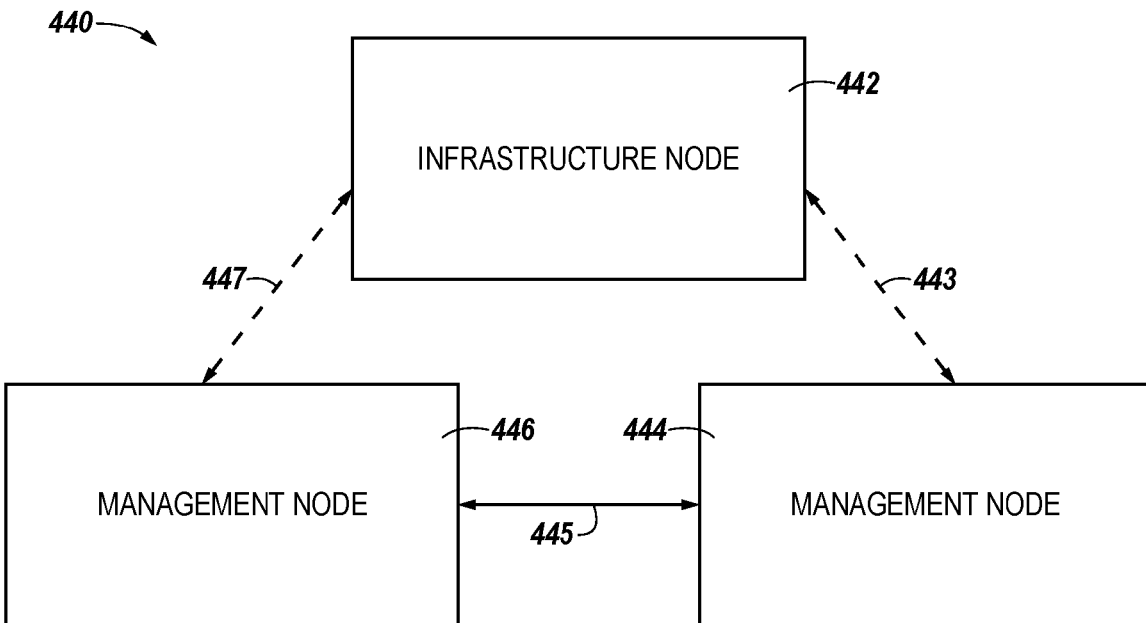
FIG. 4A is a diagram of a system for mixed mode management according to the present disclosure.

FIG. 4A is a diagram of a system 440 for mixed mode management according to the present disclosure. As shown in FIG. 4A, the system 440 can include a plurality of nodes 442, 444, 446. In some embodiments, the system 440 may include an infrastructure node 442, and management nodes 444 and 446. An infrastructure node 442 may be communicatively coupled to the management node 444 via a data path 443. The management node 444 may be communicatively coupled to the management node 446 via a data path 445, and the management node 446 may be communicatively coupled to infrastructure node 442 via a data path 447.

The data paths 443, 445, and 447 may be physical cables or may represent wireless data paths. Information may be transferred between the nodes 442, 444, and 446 via the data paths 443, 445, and 447. An example of information that may be transferred between the nodes 442, 444, and 446 via the data paths 443, 445, and 447 may include a mixed mode management plug-in. For example, the mixed mode management plug-in may be transferred from the management node 444 to the management node 446 via a data path 445. Embodiments are not so limited, however, and the mixed mode management plug-in (e.g., mixed mode management plug-in 441 illustrated in FIG. 4B) may be transferred from the management node 446 to the management node 444 via the data path 445 or the infrastructure node 442 via the data path 447. Similarly, the mixed mode management plug-in may be transferred from the management node 444 to the infrastructure node 442 via the data path 443.

One or more of the nodes 442, 444, 446 of system 440 may be operating according to different configuration profiles (e.g., the system 440 may be a mixed mode environment). For example, the infrastructure node 442 and the management node 444 may operate according to a first configuration profile, while the management node 446 may operate according to a second configuration profile. In some embodiments, the first configuration profile may be a newer version of the second configuration profile. For example, the first configuration profile may be a particular version of the configuration profile (e.g., version 6.5), while the second configuration profile may be an older version of the first configuration profile (e.g., version 6.0).

The first configuration profile (e.g., the newer version of the configuration profile) may be installed as part of an upgrade to the configuration profile of the nodes (e.g., 442 and 444). As an example, the first configuration profile may be installed as part of a rolling upgrade performed on the infrastructure node 442 and the management node 444. In some embodiments, the first configuration profile may include the mixed mode management plug-in. In such examples, the nodes 442 and/or 444 that are upgraded to the first configuration profile are also configured to store the mixed mode management plug-in and/or provide the mixed mode management plug-in to the nodes 446 that are operating according to the second (e.g., older version of) the configuration profile.

During operation of the system 440, the management node 446 may determine that other nodes in the system are operating according to a newer configuration profile, or the management node 444 or the infrastructure node 442 may determine that the management node 446 is operating according to the second configuration profile. Responsive to the determination, the mixed mode management plug-in may be transferred to the management node 446 and subsequently executed on the management node 446. In some embodiments, the mixed mode management plug-in may be transferred and/or executed without restarting the management node 446.

In some embodiments, the mixed mode management plug-in may be a web application plug-in. For example, the mixed mode management plug-in may be deployed to the management node 446 via a web application. As used herein, a "web application" is a client-server application that may be run in a web browser. The web browser may provide a graphical user interface such that a user can see and interact with the various nodes 442, 444, 446.

In some embodiments, the mixed mode management plug-in may be delivered with the newer version of the configuration profile. For example, when the newer version of the configuration profile is installed on a management node (e.g., management node 444), the mixed mode management plug-in may be hosted on that node (e.g., management node 444) and may be automatically registered with the infrastructure node 442.

Subsequently, the mixed mode management plug-in may be requested by a management node that is operating according to the older configuration profile (e.g., management node 446), transferred to the management node (e.g., management node 446), and executed thereon. Once deployed, the mixed mode management plug-in can patch the management node 446. In some embodiments, the mixed mode management plug-in can patch a set of handlers associated with the management node 446. In some embodiments, requesting the mixed mode management plug-in, transferring the mixed mode management plug-in, and/or executing the mixed mode management plug-in can occur automatically during normal installation and deployment procedures and may therefore occur without interaction from a user.

Figure 4B:
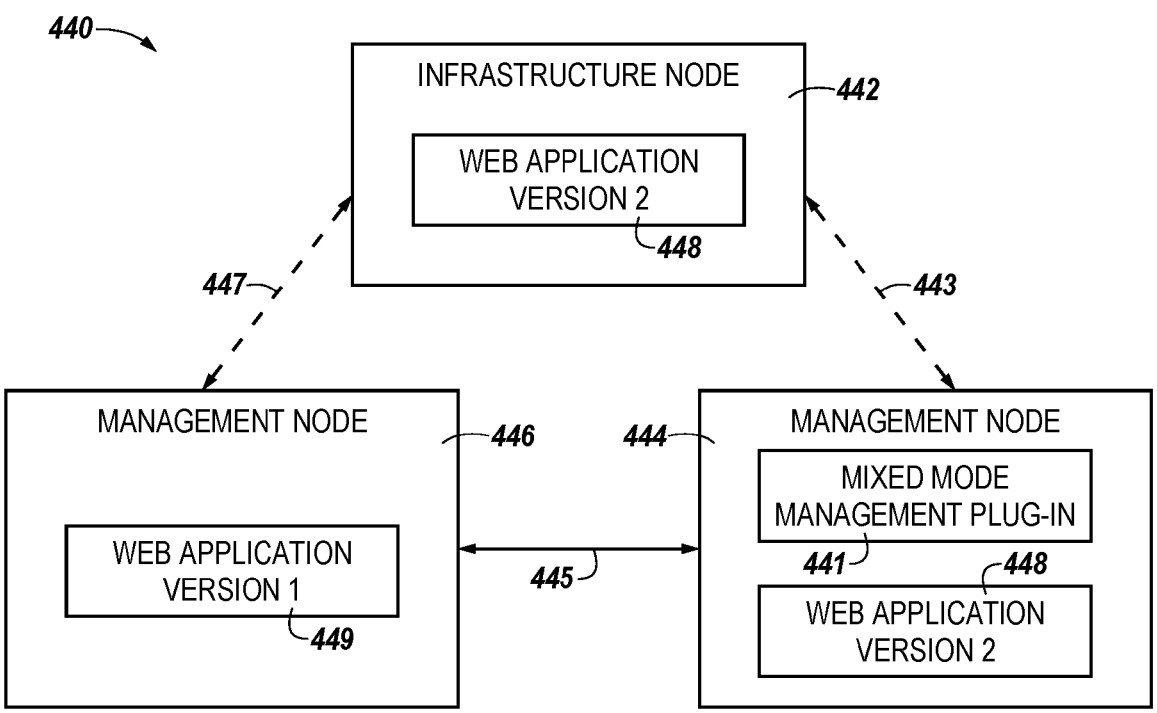
FIG. 4B is another diagram of a system for mixed mode management according to the present disclosure.

FIG. 4B is another diagram of a system for mixed mode management according to the present disclosure. Each of the nodes 442, 444, 446 may have a web application 448, 449 associated therewith. For example, each of the nodes 442, 444, 446 may be accessed and operated by logging into a respective web application 448, 449 associated with each of the nodes 442, 444, 446. As shown in FIG. 4B, the infrastructure node 442 and the management node 444 each have a web application 448 associated therewith, while the management node 446 has a web application 449 associated therewith. In some embodiments, the web application 448 may be a newer version of the web application 449.

Web application 448 may be installed as part of an upgrade to the configuration profile of the nodes 442 and 444. As an example, web application 448 may be installed as part of a rolling upgrade performed on the infrastructure node 442 and the management node 444. In some embodiments, the management node 444 may include the mixed mode management plug-in 441, or the web application 448 may include the mixed mode management plug-in 441. In such examples, the nodes 442 and/or 444 that are upgraded to the web application 448 are also configured to store the mixed mode management plug-in 441 and/or provide the mixed mode management plug-in 441 to nodes 446 that are associated with web application 449.

During operation of the system 440, the management mode 446 may determine that its web application is a different version than the web application associated with the management node 444 and/or the infrastructure node 442, or the management node 444 or the infrastructure node 442 may determine that the management node 446 has a different web application version associated therewith than the web application version associated with the management node 444 and/or the infrastructure node 442. Responsive to the determination, the mixed mode management plug-in 441 may be transferred to the management node 446 and subsequently executed on the management node 446. In some embodiments, the mixed mode management plug-in 441 may be transferred and/or executed without restarting the management node 446.

In some embodiments, the mixed mode management plug-in 441 may be delivered with the newer version of the web application (e.g., with web application 448). For example, when the newer version of the web application is installed on a management node (e.g., the management node 444), the mixed mode management plug-in 441 may be hosted on that node (e.g., the management node 444) and may be automatically registered with the infrastructure node 442.

Subsequently, the mixed mode management plug-in 441 may be requested by a management node that has the older version of the web application associated therewith (e.g., the management node 446 with web application 449), transferred to the management node (e.g., the management node 446), and executed thereon. Once deployed, the mixed mode management plug-in 441 can patch the management node 446. In some embodiments, the mixed mode management plug-in 441 can patch a set of handlers associated with the management node 446 and/or with the web application 449 of the management node 446. In some embodiments, requesting the mixed mode management plug-in 441, transferring the mixed mode management plug-in 441, and/or executing the mixed mode management plug-in 441 can occur automatically during normal installation and deployment procedures and may therefore occur without interaction from a user.

Figure 5:
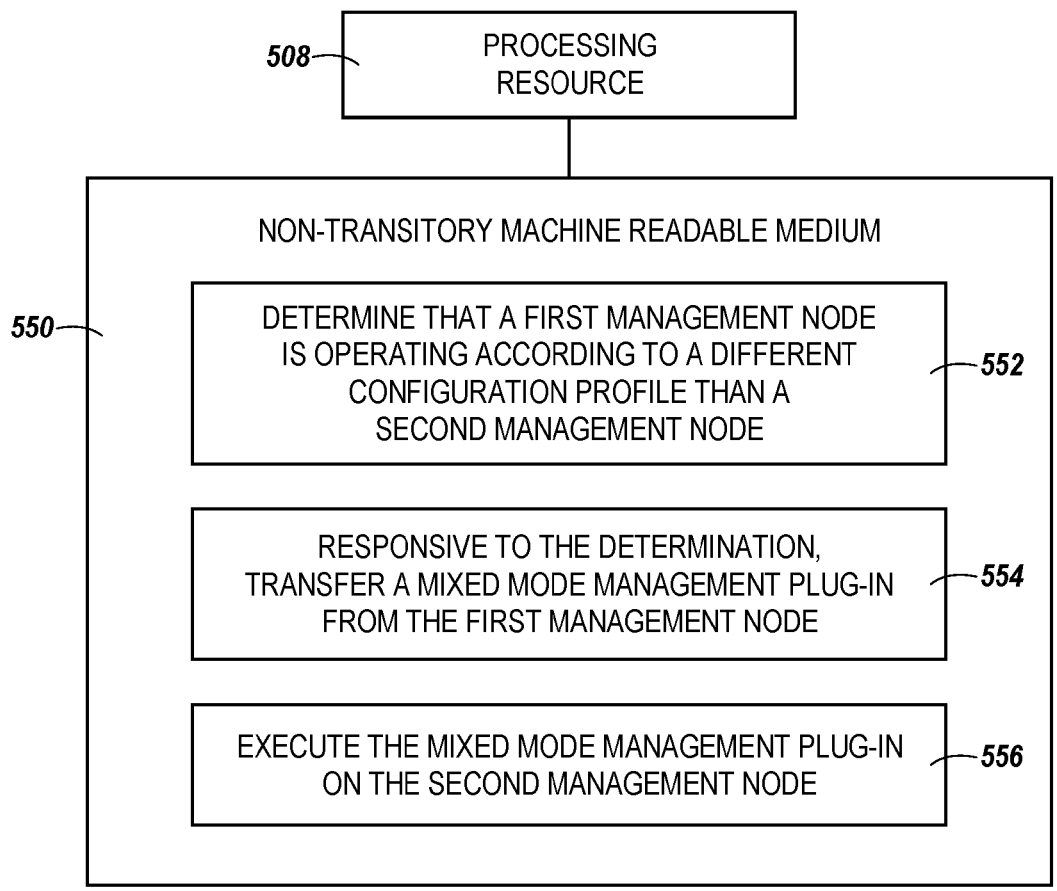
FIG. 5 is a diagram of a non-transitory machine readable medium storing instructions for mixed mode management according to the present disclosure.

FIG. 5 is a diagram of a non-transitory machine readable medium 550 storing instructions for mixed mode management according to the present disclosure. A processing resource 508 may execute instructions stored on the non-transitory machine readable medium 550. The non-transitory machine readable medium 550 may be any type of volatile or non-volatile memory or storage, such as random access memory (RAM), flash memory, read-only memory (ROM), storage volumes, a hard disk, or a combination thereof.

In some embodiments, the non-transitory machine readable medium 550 may store instructions 552 executable by the processing resource 508 to determine that a first management node is operating according to a different configuration profile than a second management node. For example, the non-transitory machine readable medium 550 may store instructions executable by the processing resource 508 to determine that the configuration profile associated with the second management node is an older version of the configuration profile associated with the first management node.

The non-transitory machine readable medium 550 may store instructions 554 executable by the processing resource 508 to transfer a mixed mode management plug-in from the first management node responsive to the determination.

The non-transitory machine readable medium 550 may store instructions 556 executable by the processing resource 508 to execute the mixed mode management plug-in on the second management node. In some embodiments, the non-transitory machine readable medium 550 may store instructions executable by the processing resource 508 to execute the mixed mode management plug-in to cause the second management node to patch the configuration profile associated with the second management node such that it is compatible with the configuration profile associated with the first management node. In some embodiments, the non-transitory machine readable medium 550 may store instructions executable by the processing resource 508 to execute the mixed mode management plug-in without fully updating the configuration profile associated with the second management node to be the same as the configuration profile associated with the first management node.

The non-transitory machine readable medium 550 may store instructions executable by the processing resource 508 to execute the mixed mode management plug-in on the second management node without restarting the second management node. In some embodiments, the non-transitory machine readable medium 550 may store instructions executable by the processing resource 508 to execute the mixed mode management plug-in on the second management node without restarting an infrastructure node communicatively coupled to the first management node and the second management node.

Figure 6:
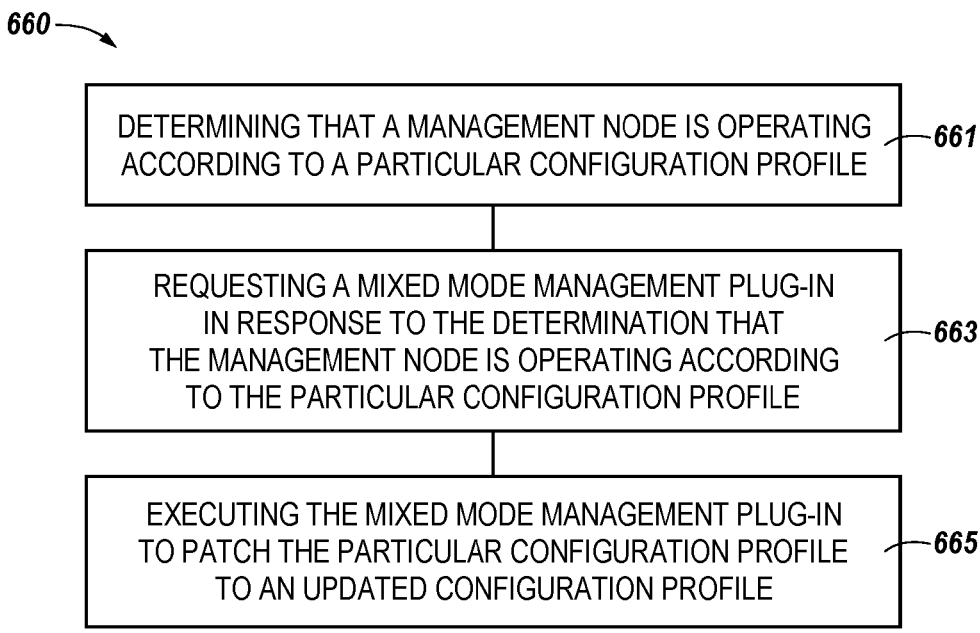
FIG. 6 is a flow diagram illustrating a method for mixed mode management according to the present disclosure.

FIG. 6 is a flow diagram illustrating a method 660 for mixed mode management according to the present disclosure. At block 661, the method 660 may include determining that a management node is operating according to a particular configuration profile. For example, the method 660 may include determining that a first management node is operating according to a first configuration profile.

At block 663, the method 660 may include requesting a mixed mode management plug-in in response to the determination that the management node is operating according to the particular configuration profile. For example, the method 660 may include requesting the mixed mode management plug-in from the first management node. Subsequent to requesting the mixed mode management plug-in from the first management node, the method 660 may include transferring the mixed mode management plug-in to the first and/or second management node from an infrastructure node communicatively coupled to the first management node and the second management node as part of installing the second configuration profile. In some embodiments, the method 660 may include transferring the mixed mode management plug-in to the first and/or second management node via a uniform resource locator stored in a manager component of the infrastructure node. For example, the uniform resource locator stored in the manager component of the infrastructure node may reference the mixed mode management plug-in hosted on the first management node.

At block 665, the method 660 may include executing the mixed mode management plug-in to patch the particular configuration profile to an updated configuration profile. For example, the method may include executing the mixed mode management plug-in on the second management node. In some embodiments, the method 660 may include executing the mixed mode management plug-in on the second management node without restarting the first management node or the second management node.

In some embodiments, the method 660 may include executing the mixed mode management plug-in on the second management node to patch the particular configuration profile to an updated configuration profile without restarting the management node. The method 660 may further include determining that a failure of the management node is occurring based on the management node operating according to the particular configuration profile.

In some embodiments, the method 660 may include determining that a second management node is operating according to a second configuration profile. For example, the method 660 may include determining that the first management node is hosting a mixed mode management plug-in responsive to the determination that the second node is operating according to the second configuration profile.

In some embodiments, the method 660 may include determining that a failure of the second management node is occurring based on the second management node operating according a different configuration profile than the first management node. For example, the second management node may experience a failure as a result of operating according to a different configuration profile than the first management node. In some embodiments, the configuration profile of the second management node may be older than the configuration profile of the first management node and may therefore not be fully compatible with the configuration profile of the first management node, which may lead to a failure of the second management node.

In some embodiments, the method 660 may include requesting the mixed mode plug-in from an infrastructure node as part of a request for all plug-ins registered with the infrastructure node at log in. For example, when a user logs into the first management node or the second management node, that particular management node may request all plug-ins registered with the infrastructure and transfer them to the management node. The mixed mode management plug-in may be included among the other plug-ins registered with the infrastructure node.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Various advantages of the present disclosure have been described herein, but embodiments may provide some, all, or none of such advantages, or may provide other advantages.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A method for mixed mode management, the method comprising: determining that a first management node includes a first version of a web application according to a first version of a configuration profile, the first web application comprising a first version of a mixed mode management plug-in; determining that a second management node includes a second version of the web application according to a second version of the configuration profile, the second web application comprising a second version of the mixed mode management plug-in; based on determining that the second version of the web application is older than the first version, sending the first version of the web application and first version of the mixed mode management plug-in to the second management node; installing the first version of the web application at the second management node; and hosting the first version of the mixed mode management plug-in from the first version of the web application at the second management node, wherein each of the first and second management nodes controls at least one respective virtual computing instance.

2. The method of claim 1, further comprising generating the mixed mode management plug-in at an infrastructure node, the infrastructure node communicating with and providing common services to a plurality of management nodes including the first management node and the second management node.

3. The method of claim 2, wherein determining that the second version of the web application is older than the first version is performed by the infrastructure node.

4. The method of claim 1, further comprising sending a third version of the configuration profile to the second management node, wherein the third version of the configuration profile specifies the first version of the mixed mode management plug-in.

5. The method of claim 1, wherein installing the first version of the web application at the second management node includes patching a set of handlers associated with operation of the second management node.

6. The method of claim 1, further comprising updating the second version of the mixed mode management plug-in subsequent to the installing of the first version of the mixed mode management plug-in.

7. The method of claim 1, wherein the second management node is configured to install the first version of the web application without restarting a respective virtual computing instance.

8. A non-transitory, computer-readable medium comprising instructions that, when executed by a processor, perform stages for mixed mode management, the stages comprising: determining that a first management node includes a first version of a web application according to a first version of a configuration profile, the first web application comprising a first version of a mixed mode management plug-in; determining that a second management node includes a second version of the web application according to a second version of the configuration profile, the second web application comprising a second version of the mixed mode management plug-in; based on determining that the second version of the web application is older than the first version, sending the first version of the web application and first version of the mixed mode management plug-in to the second management node; installing the first version of the web application at the second management node; and hosting the first version of the mixed mode management plug-in from the first version of the web application at the second management node, wherein each of the first and second management nodes controls at least one respective virtual computing instance.

9. The non-transitory machine-readable medium of claim 8, the stages further comprising generating the mixed mode management plug-in at an infrastructure node, the infrastructure node communicating with and providing common services to a plurality of management nodes including the first management node and the second management node.

10. The non-transitory machine-readable medium of claim 9, wherein determining that the second version of the web application is older than the first version is performed by the infrastructure node.

11. The non-transitory machine-readable medium of claim 8, the stages further comprising sending a third version of the configuration profile to the second management node, wherein the third version of the configuration profile specifies the first version of the mixed mode management plug-in.

12. The non-transitory machine-readable medium of claim 8, wherein installing the first version of the web application at the second management node includes patching a set of handlers associated with operation of the second management node.

13. The non-transitory machine-readable medium of claim 8, the stages further comprising updating the second version of the mixed mode management plug-in subsequent to the installing of the first version of the mixed mode management plug-in.

14. The non-transitory machine-readable medium of claim 8, wherein the second management node is configured to install the first version of the web application without restarting a respective virtual computing instance.

15. A system for mixed mode management, comprising: a memory storage including a non-transitory, computer-readable medium comprising instructions; and at least one server including a processor that executes the instructions to carry out stages comprising: determining that a first management node includes a first version of a web application according to a first version of a configuration profile, the first web application comprising a first version of a mixed mode management plug-in; determining that a second management node includes a second version of the web application according to a second version of the configuration profile, the second web application comprising a second version of the mixed mode management plug-in; based on determining that the second version of the web application is older than the first version, sending the first version of the web application and first version of the mixed mode management plug-in to the second management node; installing the first version of the web application at the second management node; and hosting the first version of the mixed mode management plug-in from the first version of the web application at the second management node, wherein each of the first and second management nodes controls at least one respective virtual computing instance.

16. The system of claim 15, the stages further comprising generating the mixed mode management plug-in at an infrastructure node, the infrastructure node communicating with and providing common services to a plurality of management nodes including the first management node and the second management node.

17. The system of claim 16, wherein determining that the second version of the web application is older than the first version is performed by the infrastructure node.

18. The system of claim 15, the stages further comprising sending a third version of the configuration profile to the second management node, wherein the third version of the configuration profile specifies the first version of the mixed mode management plug-in.

19. The system of claim 15, wherein installing the first version of the web application at the second management node includes patching a set of handlers associated with operation of the second management node.

20. The system of claim 15, the stages further comprising updating the second version of the mixed mode management plug-in subsequent to the installing of the first version of the mixed mode management plug-in.

* * * * *